US006634620B2

(12) United States Patent
Sim

(10) Patent No.: US 6,634,620 B2
(45) Date of Patent: Oct. 21, 2003

(54) VEHICLE CONTROL ARM TOOL

(76) Inventor: Henry Sim, 45-685 Kamehameha Hwy., Kaneohe, HI (US) 96744

( * ) Notice: Subject to any disclaimer, the term of this patent is extended or adjusted under 35 U.S.C. 154(b) by 1 day.

(21) Appl. No.: 10/007,525

(22) Filed: Oct. 22, 2001

(65) Prior Publication Data

US 2003/0075710 A1 Apr. 24, 2003

(51) Int. Cl.$^{7}$ .................. B23P 19/04
(52) U.S. Cl. .................. 254/131
(58) Field of Search .................. 29/267, 243.56; 254/131, 17, 15, 25

(56) References Cited

U.S. PATENT DOCUMENTS 2,681,791 A * 6/1954 Hahn .................. 254/131
4,999,898 A * 3/1991 Schmeling .................. 29/243.56
5,020,202 A * 6/1991 Turrell .................. 29/243.56
5,271,115 A * 12/1993 Senters .................. 254/131
5,626,063 A * 5/1997 Kosbab .................. 254/131
D424,901 S * 5/2000 Landry .................. D8/59

* cited by examiner

*Primary Examiner*—Robert C. Watson
(74) *Attorney, Agent, or Firm*—Michael I Kroll

(57) ABSTRACT

The present invention 10 discloses a special purpose tool for removing control arms 18 from ball joint sockets 24 of vehicles 20. The present invention comprises an elongated handle 22 consisting of steel tubing along with a front end piece 16 made from steel round stock being offset with member 30 from the handle 22. Also a U-shaped bracket 28 is welded to the front end piece wherein the bracket has a hook 34 with a point 38 on the hook for contacting various structures of the vehicle 20. The point 38 of the hook, the front tip 36 and the handle 22 all lie in a single plane so that the tool will not rotate and slip off the work piece. The present invention can also have variously shaped surfaces on the point 38 of the hook and the front tip 36 for contacting various structures on a vehicle.

13 Claims, 9 Drawing Sheets

VEHICLE CONTROL ARM TOOL

BACKGROUND OF THE INVENTION

1. Field of the Invention

The present invention relates generally to special automotive tools. The device of the present invention is to be used as a special purpose pry bar. The handle consists of a one-inch steel tubing to minimize weight and flexibility. The front section is made by bending ⅞ steel round stock to a specific shape. A hook shaped bracket is welded to the front to allow the tool to be hooked on to the lower control arm of various vehicles. Contact point of the hook, the front tip and the handle all lie in one plane so the tool will not rotate and slip off the work. There are also curved surfaces to accommodate vehicles with round control arms. Once the front of the tool is engaged with the lower arm, downward pressure on the handle will pry control arm out of the ball joint socket so steering knuckle could be moved out of the way and the axle could then be removed from the transaxle with ease.

If the vehicle is raised to the proper height, the present invention could be manipulated by tucking the handle under the technician's leg, thus allowing the technician to have both hands free to move the steering knuckle and remove the drive axle. The length of the front tip is such that it would work on almost any passenger vehicle, light truck or van.

The tool could also be useful in prying on the lower control arms in either the front or rear of the vehicle for the purposes of replacing the control arm or ball joints.

The employment of this tool allows the technician great control over the movement of the control arm, thus being able to easily manipulate the ball joint stud in and out of the socket, without the risk of pinching fingers.

2. Description of the Prior Art

There are other bar-like tools designed for manipulating work pieces. Typical of these is U.S. Pat. No. 2,896,910 issued to Cooper on Jul. 28, 1959.

Another patent was issued to Pulliam et al. on Aug. 2, 1977 as U.S. Pat. No. 4,039,140. Yet another U.S. Pat. No. 4,826,136 was issued to Thomas on May 2, 1989 and still yet another was issued on Jun. 8, 1999 to Shaffer as U.S. Pat. No. 5,909,910.

U.S. Pat. No. 2,896,910

Inventor: Guy R. Cooper

Issued: Jul. 28, 1959

The present invention relates to new and useful improvements in tools for use by carpenters either in the erection or demolition of buildings. A hand tool embodying a wrecking bar and constructed at one end with a U-shaped hook which projects laterally at one side of the bar and which may be used for various purposes in engaging lumber during the construction or wrecking of a building.

U.S. Pat. No. 4,039,140

Inventor: Barron Pulliam

Issued: Aug. 2, 1977

A tool for removing nails in the form of a bar curved to form a fulcrum at its working end, which terminates as a short first forked claw. A second forked claw of intermediate length is fixed at a second distance from the fulcrum and a long third fork claw is fixed at a second distance from the fulcrum with all forked claws being generally similarly curved and extending in the same direction from the bar. The second and third claws are used to fasten about a nail head, which has been partially lifted above the surface on which the fulcrum is rested, for complete removal of the associated nail.

U.S. Pat. No. 4,826,136

Inventor: Philip G. Thomas

Issued: May 2, 1989

A lever type tool with an elongated handle, and a head having two opposed and spaced apart claws projecting in the same direction at the opposite sides of a space to closely receive a portion of a rectangular cross section of a lumber member.

U.S. Pat. No. 5,909,910

Inventor: Danny Craig Shaffer

Issued: Jun. 8, 1999

A tool comprising a bar with a pair of teeth proved at one end of the bar and a handle portion attached at the other end of the bar approximately perpendicular to the bar. The teeth are spaced apart from each other in order to allow an end of a f-post clip to removably insert therebetween. The teeth are approximately parallel with the handle and extend outward from the bar in a direction opposite the direction that the handle extends from the bar. The tool is used to twist the ends oft-post clips in order to secure the clips to fence wire to the t-post, or alternately, to remove clips therefrom.

SUMMARY OF THE PRESENT INVENTION

The present invention discloses a special purpose tool for removing control arms from ball joint sockets of a vehicle. The present invention comprises an elongated handle consisting of steel tubing along with a front end piece made from steel round stock being offset from the handle. Also a U-shaped bracket is welded to the front end piece wherein the bracket has a hook with a point on the hook for contacting various structures of the vehicle. The point of the hook, the front tip and the handle all lie in a single plane so that the tool will not rotate and slip off the work piece. The present invention can also have variously shaped surfaces on the point of the hook and the front tip for contacting various structures on a vehicle.

A primary object of the present invention is to provide a special purpose pry-bar consisting of a hook shape welded to the front to allow the tool to be hooked on to the lower control arm of a vehicle.

Another object of the present invention is to provide a special purpose pry-bar consisting curved surfaces to accommodate vehicles with round control arms.

Yet another object of the present invention is to provide a special purpose pry-bar consisting a hook shape welded to the front to allow the tool to be hooked on to the lower control arm of a vehicle. Also a pry-bar consisting curved surfaces to accommodate vehicles with round control arms with a length of the front tip, such that it would work on almost any vehicle.

Still yet another object of the present invention is to provide a special tool that will make front-end work easier for the technician.

Yet another object of the present invention is to provide a special purpose pry-bar consisting a hook shape welded to the front to allow the tool to be hooked on to the lower control arm of a vehicle. Also a pry-bar consisting curved surfaces to accommodate vehicles with round control arms with a length of the front tip, such that it would work on almost any vehicle. Also a special tool that will make front end work easier for the technician.

Additional objects of the present invention will appear as the description proceeds.

The present invention overcomes the shortcomings of the prior art by providing a special purpose pry-bar consisting a hook shape welded to the front to allow the tool to be hooked on to the lower control arm of a vehicle. Also a pry-bar consisting curved surfaces to accommodate vehicles with round control arms with a length of the front tip, such that it would work on almost any vehicle. Also a special tool that will make front end work easier for the technician. Also providing a tool that is lightweight and will eliminate flexibility.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
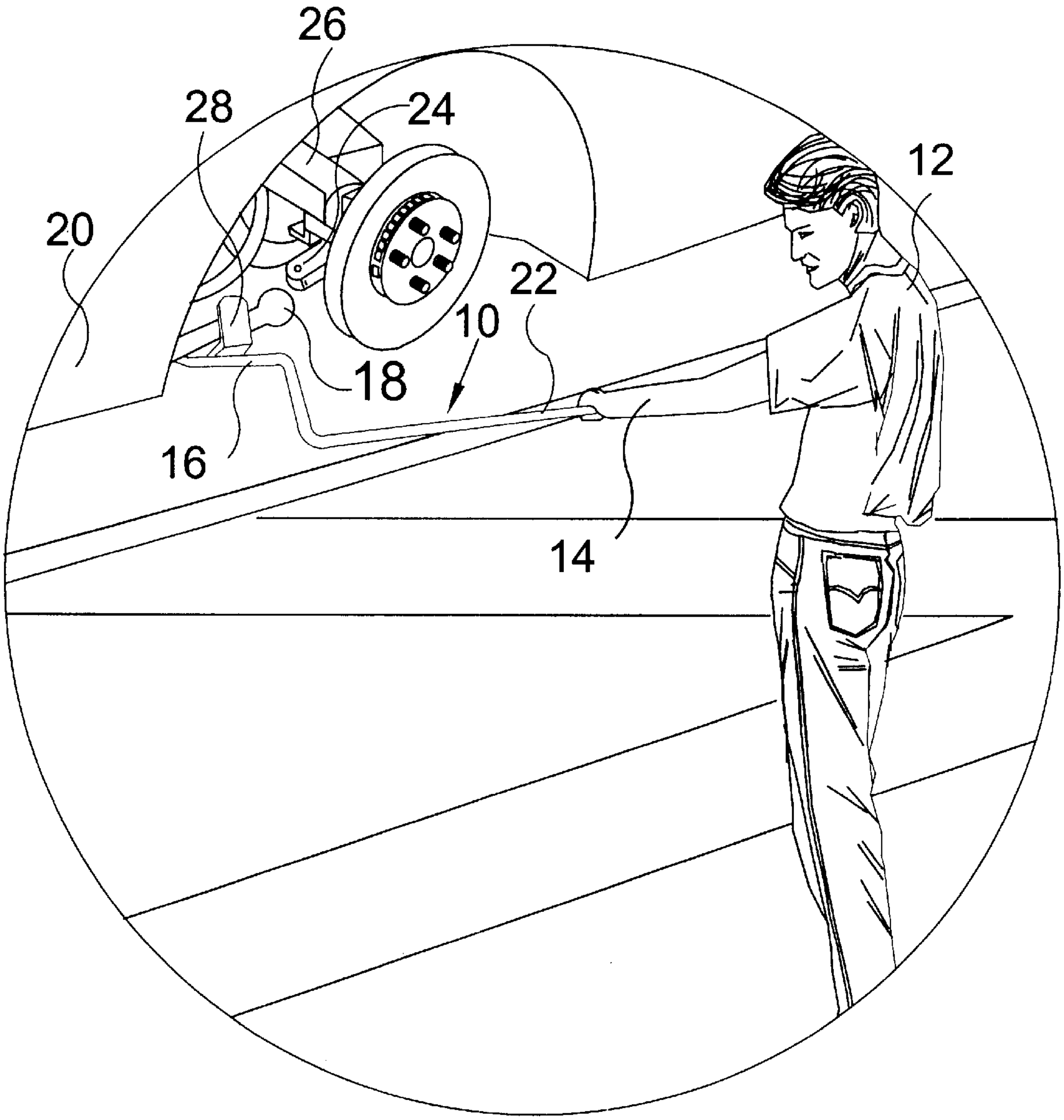
FIG. 1 is pictorial view of a technician utilizing the tool device of the present invention. The front of the tool is engaged with the lower arm, downward pressure on the handle will pry the control arm out of the ball joint socket so the steering knuckle could be moved out of the way and the axle could then be removed from the transaxle.

With regard to reference numerals used, the following numbering is used throughout the drawings.

10 present invention
12 user
14 hands
16 front end piece
18 control arm
20 vehicle
22 handle
24 ball joint socket
25 lower ball joint
26 transaxle assembly
28 bracket
30 offset
32 weld
34 hook
36 front tip
38 point of hook
40 end cap
42 insertion point
44 constant velocity axle
46 arrow
48 steering knuckle
50 brake rotor

DESCRIPTION OF THE PREFERRED EMBODIMENT(S)

In order that the invention may be more fully understood, it will now be described, by way of example, with reference to the accompanying drawings in which FIGS. 1 through 7 illustrate the present invention being a vehicle control arm tool.

Turning to FIG. 1, shown therein is pictorial view of a technician 12 utilizing the tool device of the present invention 10 in the hands 14 of the user. The front end piece 16 and U-bracket 28 of the tool are engaged with the lower control arm 18 of an elevated vehicle 20 wherein downward pressure on the handle 22 will pry the control arm 18 out of the ball joint socket 24 so the steering knuckle could be moved out of the way and the axle could then be removed from the transaxle assembly 26.

Figure 2:
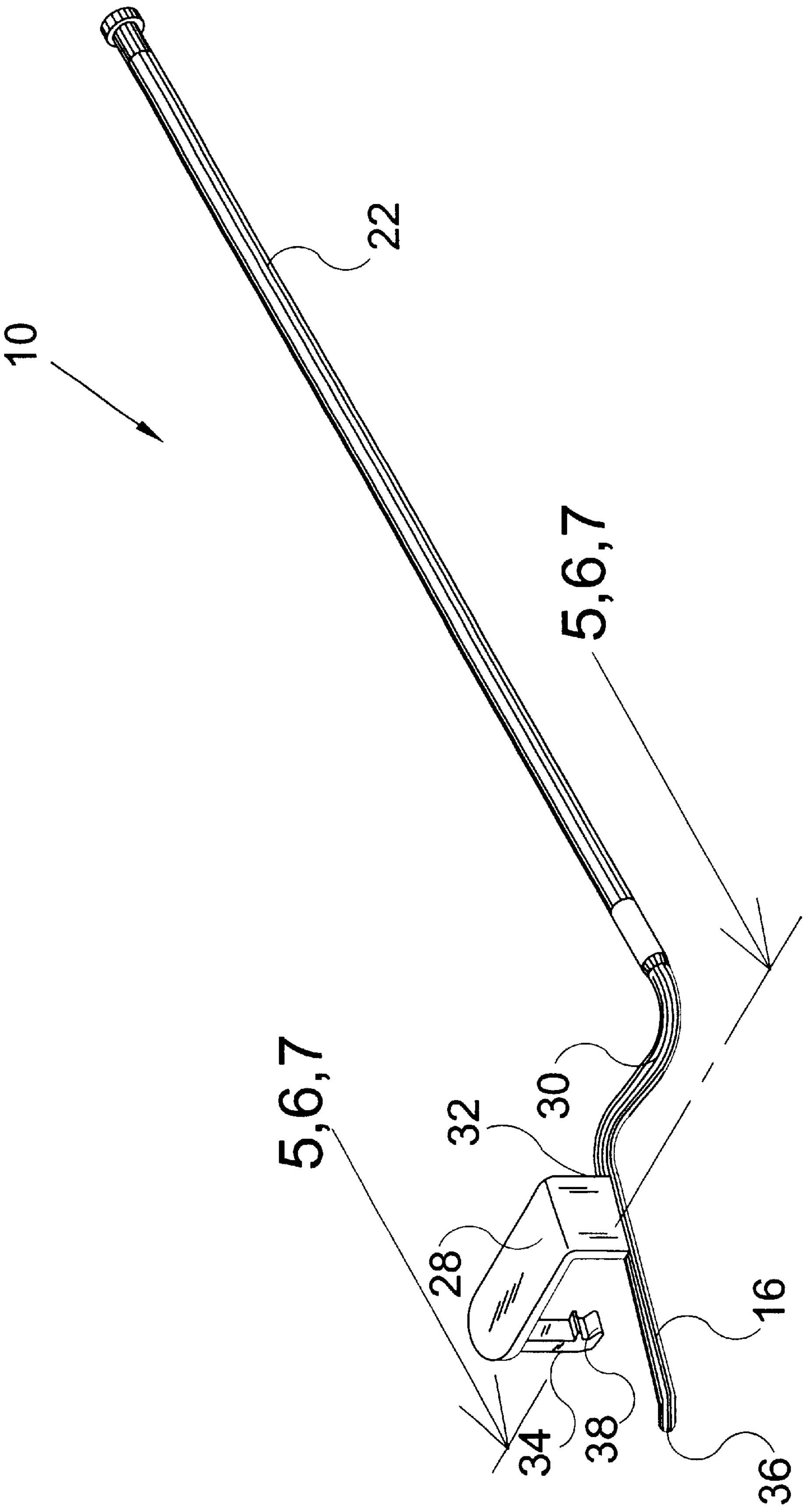
FIG. 2 is a perspective view of the tool of the present invention.

Turning to FIG. 2, shown therein is a perspective view of the present invention 10. Shown is the handle 22 which consists of an approximate 1 inch steel tubing which minimizes the weight and flexibility thereof The front end piece 16 is laterally offset from the first end of and the centerline of the handle 22 with a short section 30 and is made by bending approximately ⅞ inch steel round stock. A U-shaped bracket 28 is transversly attached by welding 32 to the front end piece 16 in order to allow the tool to be hooked at 34 onto the lower control arm of various vehicles. Also shown is a front tip 36 of the front end piece. The contact point 38 of the hook 34, the front tip 36 and the handle 22 all lie in one plane so the tool will not rotate and slip off the work piece. Hook 34 forms one leg of the U-shaped bracket 28 and has a point or protrusion 38 disposed perpendicularly and inwardly thereon for gripping a surface.

Figure 3:
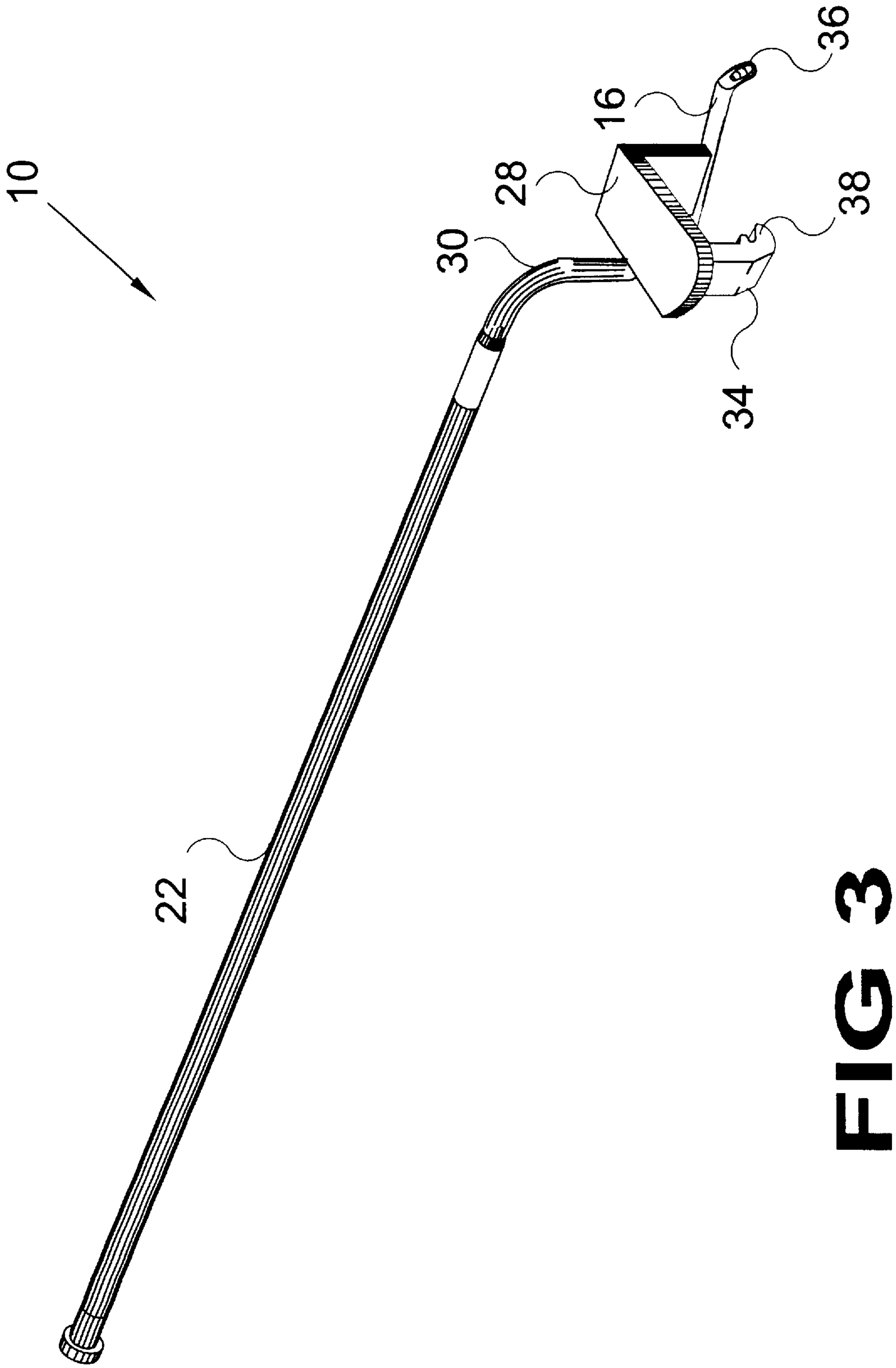
FIG. 3 is a perspective view of the tool of the present invention from another perspective view.

Turning to FIG. 3, shown therein is a perspective view of the tool of the present invention 10 from another perspective view. Shown therein is the handle member 22 having an offset section 30 of the front end piece 16 upon which is attached the bracket 28 having the hook member 34 thereon. Also shown is the front tip 36 and the point of hook 38 having different shapes to their structure whereby they can accommodate variously shaped pieces of structure which might be found on different vehicles.

Figure 4:
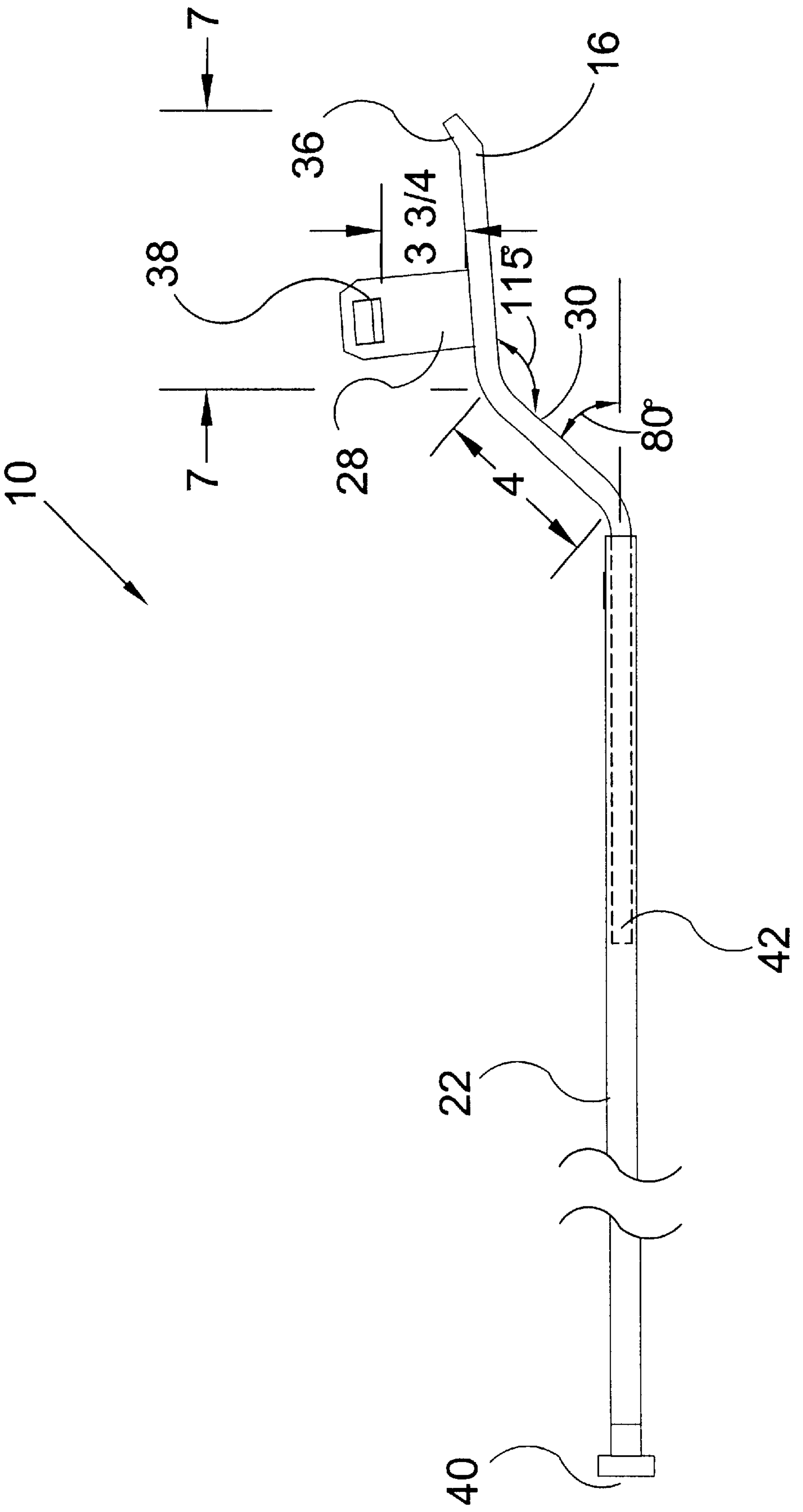
FIG. 4 is a cross sectional view of the present invention showing the end cap, steel tubing, half round tip, and steel bar inserted in tubing.

Turning to FIG. 4, shown therein is an elevation view of the present invention 10 showing the handle end cap 40, steel handle tubing 22, half round tip 36, the rear part of the steel bar of front end piece 16 inserted fixedly at 42 into tubing 22, along with bracket 28. Short section 30 is approximately 4 inches long being offset at an angle of about 80 degrees from the centerline of handle 22 and connects to the rear of front end piece 16. Front end piece 16 is about 7 inches long from its rear to its front tip 36 being offset about 115 degrees from the centerline of short section 30. The point of the hook 38 is about 3¾ inches from the front end piece 16.

Figure 5:
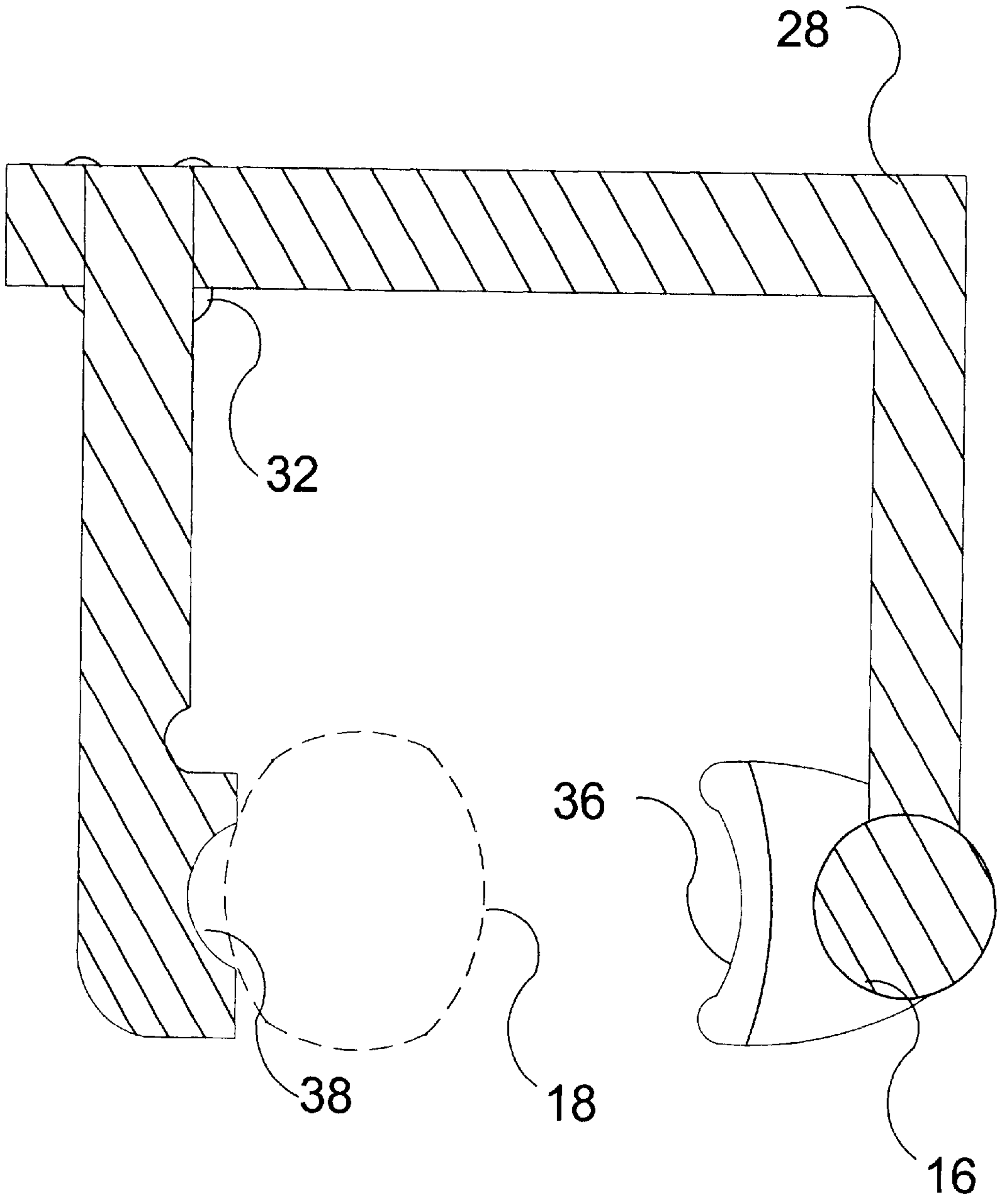
FIG. 5 is a frontal cross sectional view of the present invention showing the half round tip, the bracket and bracket tongue shaped to fit different shapes.

Turning to FIG. 5, shown therein is a frontal cross sectional view of the present invention taken from FIG. 2 as indicated showing the half round or concave tip 36, front end piece 16, the bracket 28 and bracket hook point 38 shaped e.g., concave, to fit different shapes. Weld 32 is shown along with a structural member of the vehicle, e.g., a control arm 18 is shown in phantom. The concave tip 36 and concave point 38 oppose each other for gripping surfaces.

Figure 6:
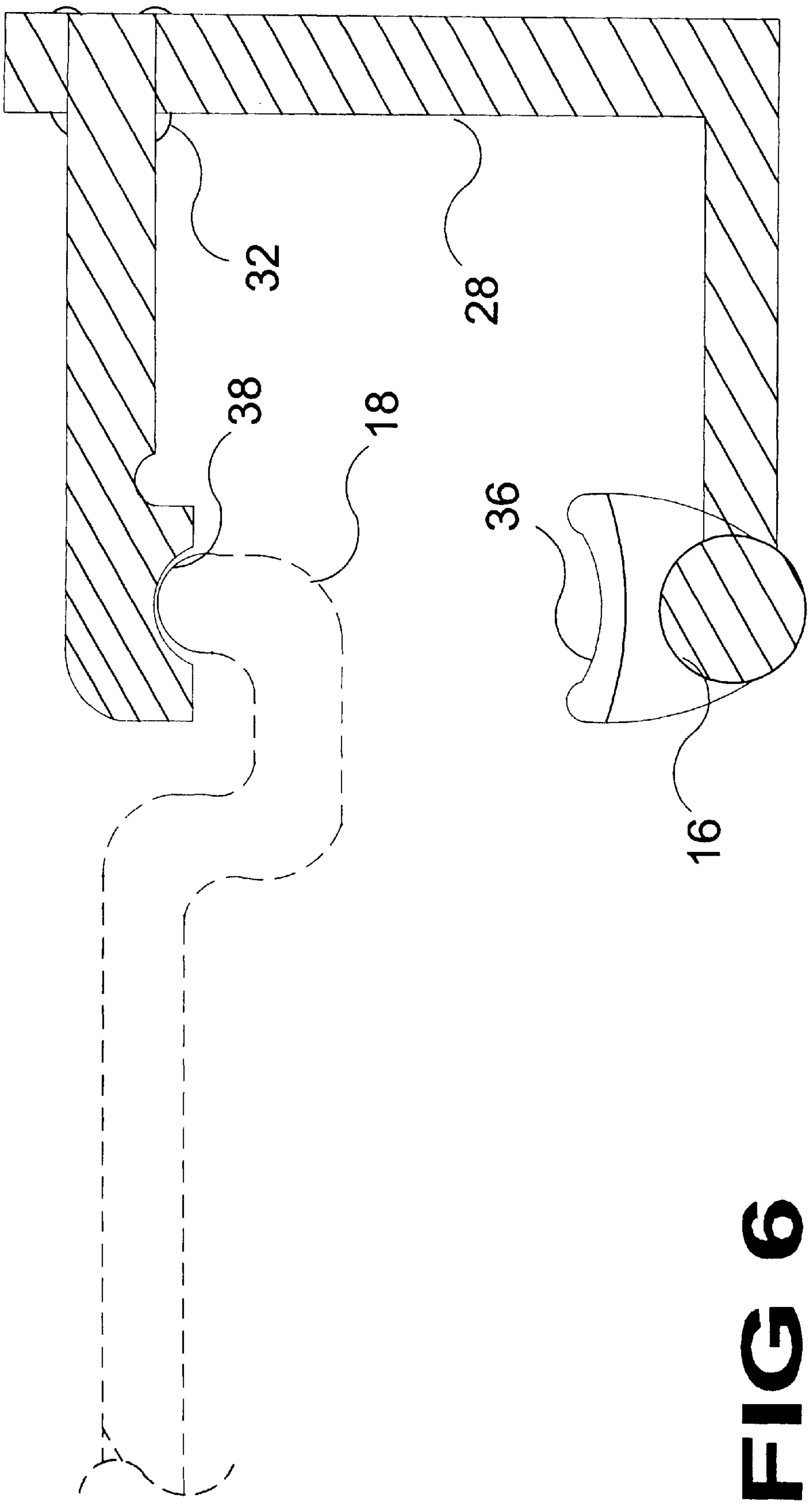
FIG. 6 is a frontal cross sectional view showing the brackets capabilities as it is shaped to fit different shaped objects.

Turning to FIG. 6, shown therein is a frontal cross sectional view of the present invention taken from FIG. 2 as indicated showing the half round tip 36, front end piece 16, the bracket 28 and bracket hook point 38 shaped to fit different shapes. Weld 32 is shown along with a structural member of the vehicle, e.g., a control arm 18 is shown in phantom.

Figure 7:
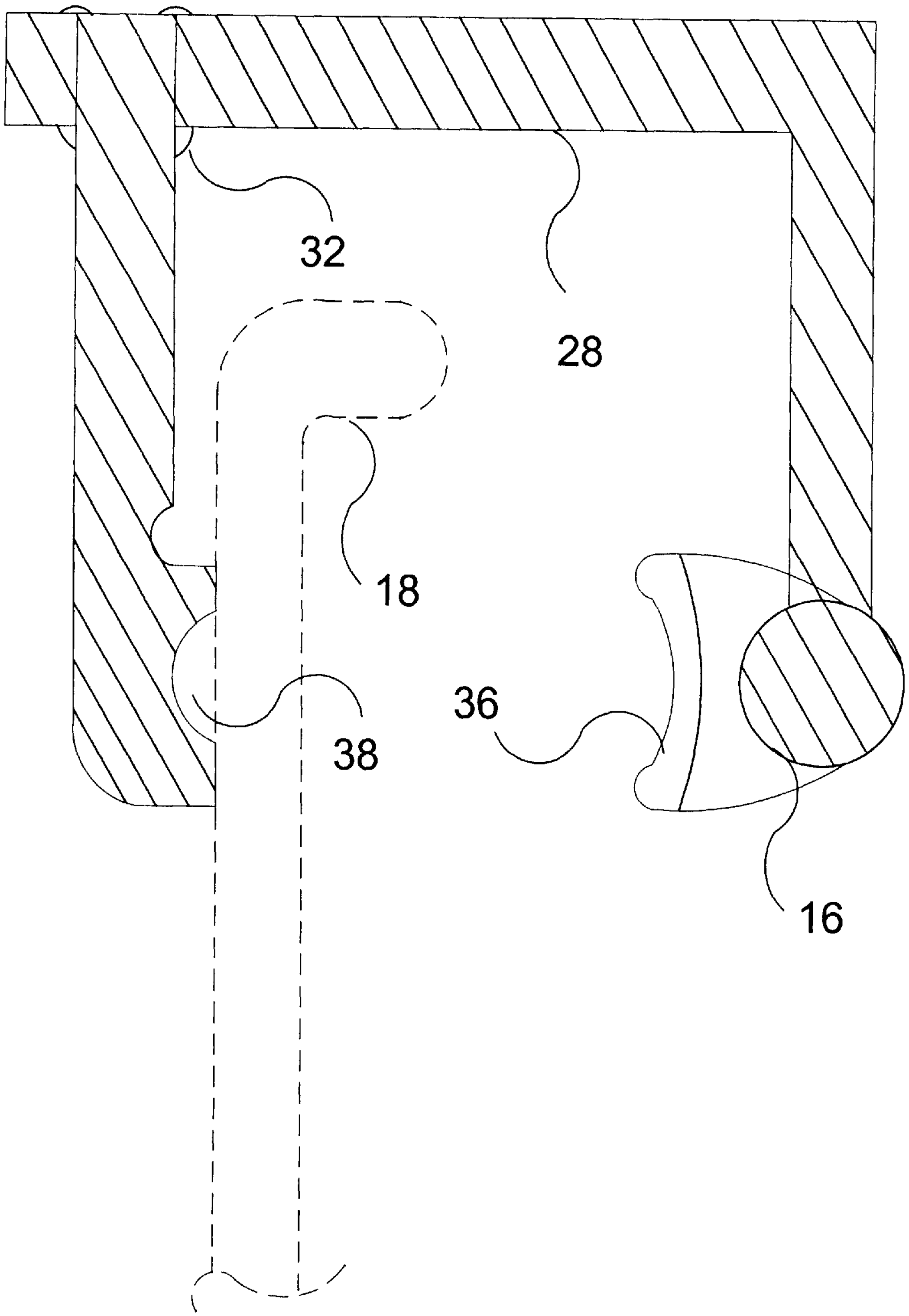
FIG. 7 is a frontal cross sectional view showing the brackets capabilities as it is shaped to fit an alternate object.

Turning to FIG. 7, shown therein is a frontal cross sectional view of the present invention taken from FIG. 2 as indicated showing the half round tip 36, front end piece 16, the bracket 28 and bracket hook point 38 shaped to fit different shapes. Weld 32 is shown along with a structural member of the vehicle, e.g., a control arm 18 is shown in phantom.

Figure 8:
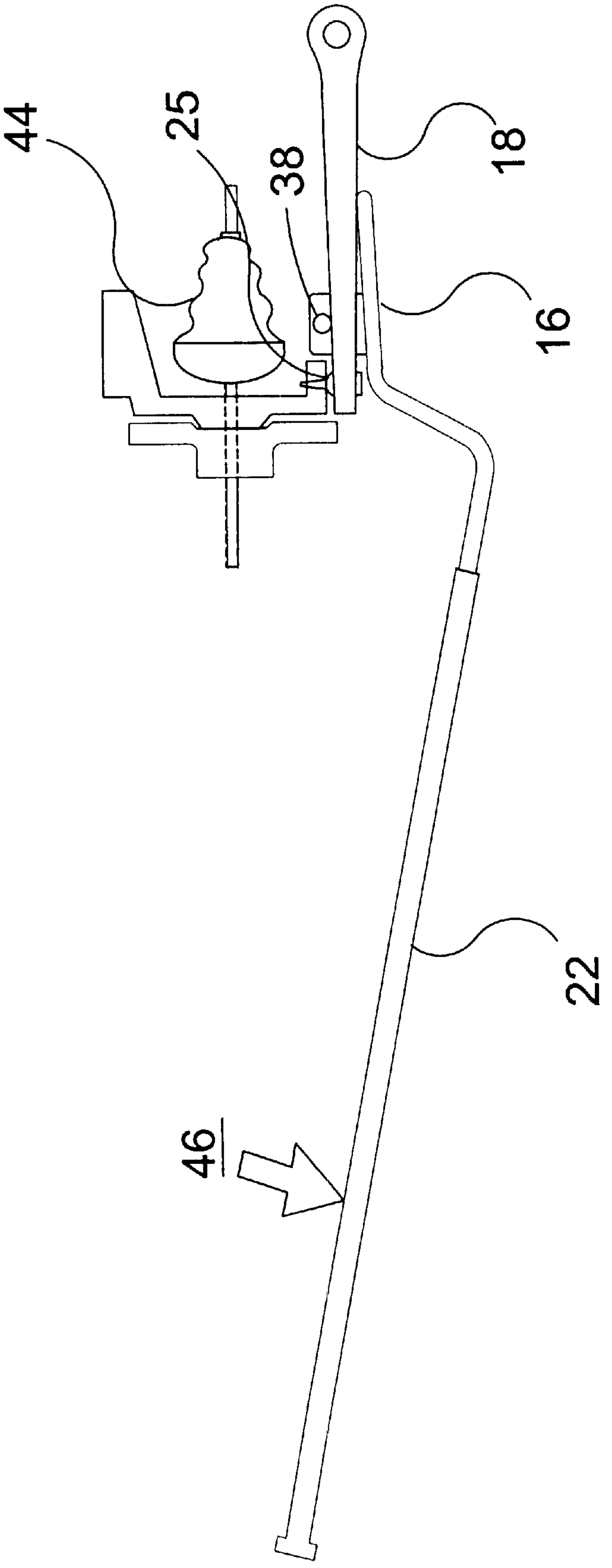
FIG. 8 is a perspective view of the present invention in operative connection with parts of a vehicle.

Turning to FIG. 8, shown therein is a perspective view of the present invention 10 in operative connection with a lower control arm 18 before the ball joint 25 has been removed from its socket. Shown is the handle 22 and front end piece 16 having force, as shown by arrow 46, applied to the handle 22 in order to remove the lower ball joint 25 from its socket. The point 38 of the hook is shown contacting the control arm 18. The constant velocity axle 44 is also shown.

Figure 9:
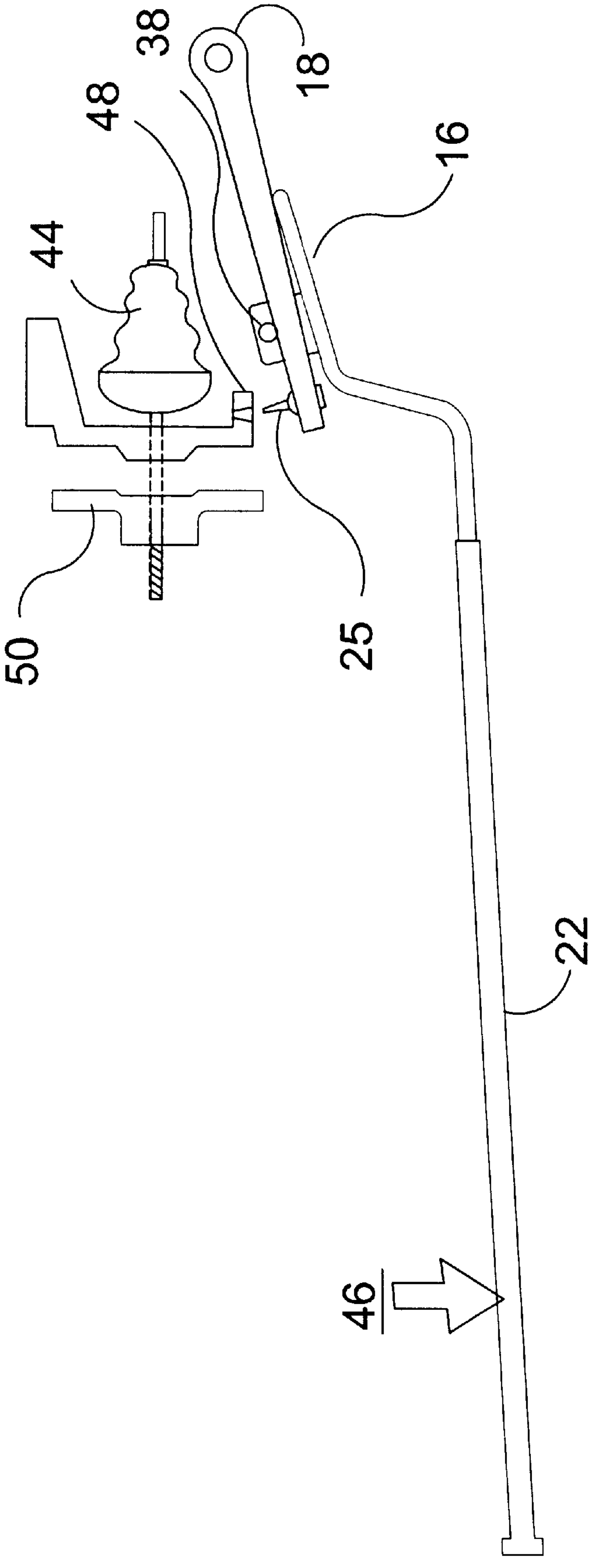
FIG. 9 is a perspective view of the present invention in operative connection with parts of a vehicle.

Turning to FIG. 9, shown therein is a perspective view of the present invention 10 in operative connection with a lower control arm 18 after the ball joint 25 has been removed from its socket. Shown is the handle 22 and front end piece 16 having force, as shown by arrow 46, applied to the handle 22 in order to remove the lower ball joint 25 from its socket. The point 38 of the hook is shown contacting the control arm 18. The constant velocity axle 44, steering knuckle 48 and brake rotor 50 are also shown.

What is claimed to be new and desired to be protected by Letters Patent is set forth in the appended claims:

1. An apparatus for a pry bar for engaging structural members of a vehicle, comprising:

a) an elongated handle for being grasped by a user, said handle having a first end and a second end;

b) a front end piece disposed on said first end of said handle, said front end piece for contacting a structural member of a vehicle;

c) an offset disposed in said front end piece, said front end piece being thereby laterally offset from said handle;

d) a front tip disposed on said front end piece, said front end piece having a rear end;

e) a U-shaped bracket disposed transversely from said front end piece;

f) a hook disposed on said U-shaped bracket, said hook forming one leg of said U-shaped bracket; and;

g) a protrusion disposed perpendicular said hook, said protrusion for gripping a structure on a vehicle.

2. The apparatus of claim 1, wherein said handle is hollow.

3. The apparatus of claim 2, wherein said handle further comprises about one-inch tubing.

4. The apparatus of claim 1, wherein said front end piece further comprises about ⅞ inch steel round stock.

5. The apparatus of claim 1, wherein said rear end of said front end piece is fixedly inserted into said first end of said handle.

6. The apparatus of claim 1, wherein said front end piece is laterally offset from the centerline of said handle.

7. The apparatus of claim 1, wherein said bracket is welded to said front end piece.

8. The apparatus of claim 1, wherein said protrusion is disposed on the end of said hook.

9. The apparatus of claim 8, wherein said protrusion is disposed inwardly on said U-shaped bracket so as to securely contact a structure on a vehicle.

10. The apparatus of claim 9, wherein said protrusion, said front tip, and said handle lie in the same plane so as to securely contact a structure on a vehicle.

11. The apparatus of claim 9, wherein said front tip further comprises a concave shaped face disposed thereon.

12. The apparatus of claim 11, wherein said protrusion further comprises a concave shaped face disposed thereon.

13. The apparatus of claim 12, wherein said concave face of said protrusion and said concave face of said front tip generally oppose each other.

* * * * *